United States Patent [19]

Ward et al.

[11] Patent Number: 4,947,065
[45] Date of Patent: Aug. 7, 1990

[54] STATOR ASSEMBLY FOR AN ALTERNATING CURRENT GENERATOR

[75] Inventors: Robert W. Ward; Robert E. Campbell; William E. Boys, all of Anderson, Ind.

[73] Assignee: General Motors Corporation, Detroit, Mich.

[21] Appl. No.: 410,782

[22] Filed: Sep. 22, 1989

[51] Int. Cl.⁵ ............................................. H02K 15/12
[52] U.S. Cl. ........................................ 310/44; 310/43; 310/45; 310/179; 310/259; 336/233; 252/62.54
[58] Field of Search ............... 310/43, 44, 45, 179, 310/216, 254, 259, 180, 184; 336/233; 252/62.54, 62.55; 428/66, 329

[56] References Cited

U.S. PATENT DOCUMENTS

| | | | |
|---|---|---|---|
| 3,255,512 | 6/1966 | Lochner | 310/44 |
| 3,293,471 | 12/1966 | De Jean et al. | 310/217 |
| 3,325,760 | 6/1967 | Bernard | 335/281 |
| 3,387,311 | 6/1983 | Kobayashi et al. | 310/43 |
| 3,758,799 | 9/1973 | Docherman et al. | 310/43 |
| 3,763,080 | 10/1973 | Deuter | 260/37 EP |
| 3,777,295 | 12/1973 | Laing | 335/297 |
| 3,842,148 | 10/1974 | Loubier | 264/24 |
| 3,923,927 | 12/1975 | Mijake et al. | 260/861 |
| 4,128,527 | 12/1978 | Kinjo et al. | 310/43 |
| 4,177,089 | 12/1979 | Bankson | 148/31.55 |
| 4,250,128 | 2/1981 | Meckling | 264/24 |
| 4,272,749 | 6/1981 | Tuji | 336/233 |
| 4,352,897 | 10/1982 | Ogata et al. | 310/43 |
| 4,492,884 | 1/1985 | Asano | 310/45 |
| 4,543,208 | 8/1985 | Horie et al. | 252/62.54 |
| 4,562,019 | 7/1984 | Inoue | 264/24 |
| 4,601,765 | 7/1986 | Soileau et al. | 148/104 |
| 4,604,538 | 8/1986 | Merrill et al. | 310/68 D |

OTHER PUBLICATIONS

Powder Metallurgy, vol. 25, No. 4, pp. 201-208, "Properties & Applications of Soft Magnetic Powder Composites", Kordecki et al.; (No Month) 1982.
Powder Metallurgy, No. 4, pp. 210-216, "Effect of Fe₃P Addition on Magnetic Properties & Structure of Sintered Iron", Yeglinski et al; (No Month) 1980.

*Primary Examiner*—R. Skudy
*Attorney, Agent, or Firm*—C. R. Meland

[57] ABSTRACT

A stator assembly for an alternating current generator. The stator core is a one-piece molded part that is formed of iron powder having a particle size in a range of about 10 to 250 microns. The powder is bound together by a thermoplastic material which covers the particles and which serves to insulate the particles from each other. The particles may be coated with phosphorus and the phosphorus layer overcoated with the thermoplastic material. A three-phase output stator winding is carried by the core and has conductor portions located in core slots.

4 Claims, 1 Drawing Sheet

STATOR ASSEMBLY FOR AN ALTERNATING CURRENT GENERATOR

This invention relates to a stator assembly for alternating current generators.

Alternating current generators of the type disclosed in the United States Pat. No. 4,604,538 to Merrill et al. utilize a stator assembly where the stator core is formed of a stack of steel laminations. The manufacture of slotted stator cores involves die stamping sheet steel to the required shape. After stamping, the laminations must be stacked in correct alignment and the stack of laminations must then be secured together, for example, by welding. Further, in die stamping the laminations, there is a certain amount of scrap loss.

As an alternative to the use of steel laminations for magnetic cores, it has been suggested that cores could be formed from iron powder. Thus, an article in Powder Metallurgy, Volume 25, No. 4 (1982), pages 201–208, entitled "Properties and Applications of Soft Magnetic Powder Composites" authored by Kordecki, Weglinski and Kaczmar discloses magnetic cores that are formed of ferromagnetic powder. This article discloses so-called magnetodielectrics which are comprised of iron powder and a dielectric.

An example of this type of material is given in Table 1. In this example, the material is made of Hoganas ASC 40.29 powder plus 0.5% (by weight) epoxy resin. Page 205 of this article discloses iron powder of 0.2 to 0.6 mm. size and calls for a dielectric content of 0.2–1% by weight.

It has been discovered that if a molded stator core for a stator assembly of an alternating current generator of the type disclosed in the above-referenced Merrill et al. patent is formed of certain proportions of iron powder and a thermoplastic material, the stator coil will have an output that is as high as the output of a stator that has core formed of a stack of steel laminations. More specifically, a stator core made in accordance with this invention uses iron powder particles having a size in a range of about 44 to 250 microns. The particles are coated with thermoplastic material and the coated particles are then molded to the shape of a stator core. To achieve optimum power output, the proportions by weight of iron powder and thermoplastic material should be about 95 to 99.2% iron powder with a weight range of thermoplastic material of 5 to 0.8%. Some slight improvement can be obtained by first coating the particles with a phosphate material and subsequently overcoating the phosphate coating with the thermoplastic material. Where a phosphate coating is used, the ranges of material by weight should be about 95 to 99.2% iron powder, 0.05 to 0.5% phosphorus and 0.75 to 4.95% thermoplastic material.

Figure 1:
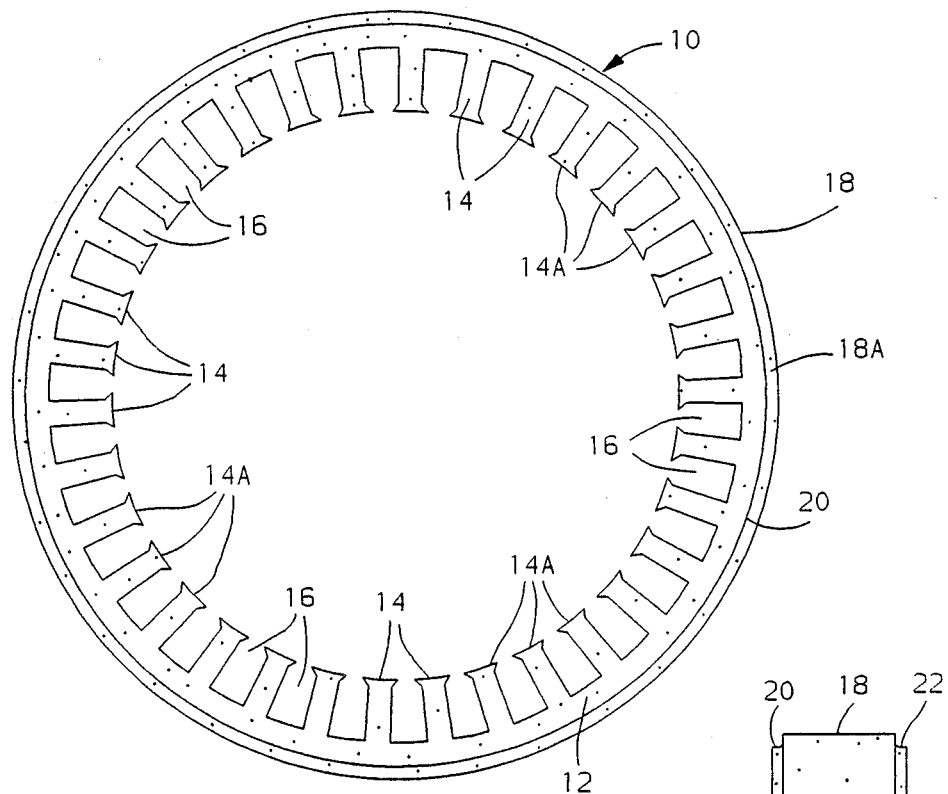
FIG. 1 is a plan view of a stator core made in accordance with this invention.

Referring now to the drawings, a stator core generally designated as 10 is illustrated that has an annular yoke portion 12 and a plurality of radially inwardly extending teeth or poles 14 that are integral with yoke portion 12. The teeth 14 each have an end face 14A and the spaces between the teeth define winding slots 16 that are adapted to receive conductor portions of a stator output winding of an alternating current generator. The outer periphery of the core 10 has a cylindrical flange portion 18. Portion 18 has annular end faces or surfaces 18A and 18B that are adapted to engage surfaces of the end frames of an alternating current generator in a manner disclosed in the above-referenced Merrill et al. patent. Further, core 10 has two outer circular surfaces 20 and 22 that are adapted to engage surfaces on the end frames of the generator.

By way of example, and not by way of limitation, the stator core may be sized such that the distance between a pair of opposed faces 14A is about 90 mm. The outside diameter between outer surfaces of core 10 may be about 120 mm. The axial length of teeth 14 and slots 16 may be about 28 mm. The radial length of portion 18 may be about 2 mm. and the axial length of surfaces 20 and 22 may be about 2 mm. The width of teeth 14 may be about 5 mm. and the radial length of these teeth can be about 12 mm.

Figure 2:
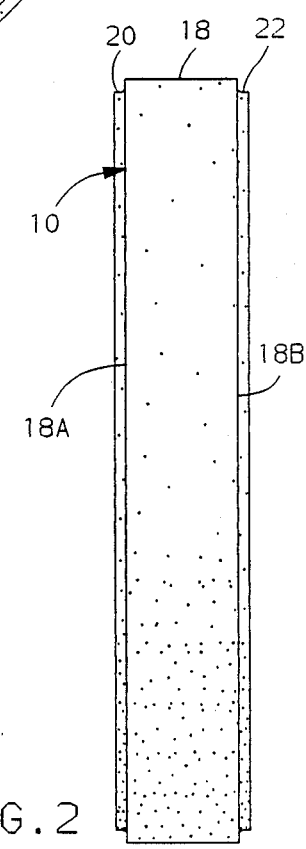
FIG. 2 is an end view of the core shown in FIG. 1.

The core 10 is formed as a one-piece part that is molded to the size and shape shown in FIGS. 1 and 2 and is comprised of particles of iron powder that are bound together by a thermoplastic material. The iron powder in core 10 may be a Hoeganaes 1000C iron powder. The particle size of this powder, based on a U.S. Standard sieve analysis is shown in the following table:

| SIEVE | PERCENT |
| --- | --- |
| +60 | 1 |
| −60/+100 | 14 |
| −100/+325 | 70 |
| −325 | 15 |

The particle sizes of the iron powder range from about 44 to 250 microns according to this sieve analysis. However, a very small percentage of the powder may have a particle size as small) as 10 microns.

The powder is about 99.7% Fe, 0.003% C, 0.0005% N, 0.006% S and 0.004% P.

The thermoplastic material may be an amorphous thermoplastic polythermide resin, an example of which is a General Electric "ULTEM" (Registered trademark General Electric) resin.

To prepare powder for molding, the particles of iron powder are coated with a thin layer of the thermoplastic material. One way of accomplishing this is to mix the thermoplastic material with a solvent to provide a liquid material. The powder is then blown by air up through a vertical tube and at the same time the liquid material is sprayed on the powder to coat the powder. The coated powder falls outside of the tube and is directed back into an inlet of the tube where it is blown up again and coated again. After a number of passes through the tube, the particles are all coated to the extent desired. The solvent evaporates or is recovered during this process.

When the iron particles have been completely coated, a quantity of the coated particles are pre-heated and placed in a heated mold that is shaped to produce the stator shown in FIGS. 1 and 2 as a one-piece stator core. The material is compression molded to the final shape and size. During compression molding the thermoplastic material is heated sufficiently to cause it to melt.

Figure 3:
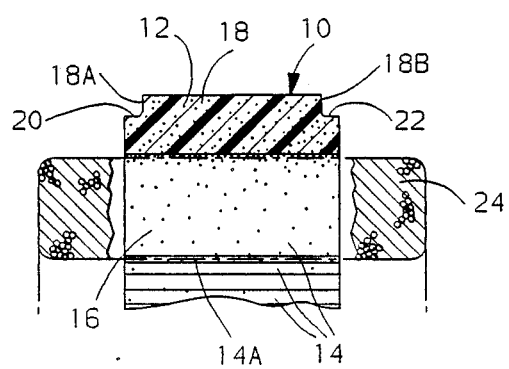
FIG. 3 is a sectional view of the portion of a stator assembly utilizing the core shown in FIG. 1.

After the stator core 10 has been molded, a three-phase winding is wound into the slots 16. A portion of this three-phase stator winding is shown in FIG. 3 where it is identified by reference numeral 24. The winding 24 may be Delta or wye connected, and conductor portions of winding 24 are located in slots 16. Only a portion of a stator assembly is shown in FIG. 3, but it is to be understood that all of the slots 16 contain conductors of the stator winding. The wound stator core provides a stator assembly for the type of alternating current generator shown in the above-referenced Merrill et al. patent and is intended to replace the stator assembly shown in that patent.

In the final molded state of the core 10, the thermoplastic material is bonded to the outer surface of each metal particle so that the particles are insulated from each other by thin layers of thermoplastic material. Further, the thermoplastic material bonds all of the particles together to form a composite structure. It will be appreciated that since the particles are separated by the thermoplastic material, there are gaps formed between the particles. These gaps act like air gaps since the thermoplastic material separating the particles has about the same permeability as air. This air gap effect increases resistivity and consequently reduces eddy current losses.

To provide output performance or power that is comparable to a stator core that is formed of laminations, the proportions of iron powder and thermoplastic material should fall within certain ranges. Thus, by weight, the core should be 95 to 99.2% iron powder and 5 to 0.80% thermoplastic. Since about 1% by weight of thermoplastic material is equal to about 4% by volume, a core that is 99% iron powder by weight and 1% thermoplastic by weight would be 96% iron powder by volume and 4% thermoplastic material by volume.

Some improvement in performance can be achieved if the iron particles have a phosphorus coating. Thus, the iron powder can be coated with a phosphate or phosphorus and this phosphorus is then overcoated with the thermoplastic material. When using phosphorus, the proportions should be, by weight, 95% to 99.2% iron powder, 0.05% to 0.5% phosphorus and 0.75% to 4.95% thermoplastic.

Some of the advantages of the molded stator of this invention is the elimination of dies and die maintenance that are required for blanking laminations. Further, extra machinery operations and the need for fastening a stack of laminations together is eliminated. Material scrap losses are minimized and manufacturing re-operation encountered where sharp corners of laminations remove stator conductor insulation will be greatly reduced by using a molded part. A molded core can have rounded edges, and desired dimensions will be more accurate and easier to control to closer tolerances.

The embodiments of the invention in which an exclusive property or privilege is claimed are defined as follows:

1. A stator for an alternating current generator comprising, a one-piece molded stator core having an annular yoke portion and a plurality of integral circumferentially spaced and radially inwardly extending teeth, the spaces between the teeth defining circumferentially spaced slots, a stator coil winding carried by said core having conductor portions located in said slots, said core being molded and comprised of iron powder that has a particle size in a range of about 10 to 250 microns, said particles being bound together by a thin coating of thermoplastic material that coats the particles and electrically insulates the particles from each other, said core by weight, having a range of iron powder of about 95 to 99.2 percent and a weight range of thermoplastic material of about 5 to 0.8 percent.

2. The stator according to claim 1 where the stator coil winding is a three-phase winding.

3. A stator for an alternating current generator comprising, a one-piece molded stator core having an annular yoke portion and a plurality of integral circumferentially spaced and radially inwardly extending teeth, the spaces between the teeth defining circumferentially spaced slots, a stator coil winding carried by said core having conductor portions located in said slots, said core being molded and comprised of iron powder that has a particle size in a range of about 10 to 250 microns, said particles having a phosphorus coating and said phosphorus coating being covered by a thermoplastic material, said particles being bound together by said thermoplastic material and said thermoplastic material insulating the particles from each other, said core by weight having a range of iron powder of about 95 to 99.2 percent, a weight range of phosphorus of about 0.05 to 0.5 percent and a weight range of thermoplastic material of about 0.75 to 4.95 percent.

4. The stator according to claim 3 where said stator coil winding is a three-phase winding.

* * * * *